US010339393B2

(12) United States Patent
Masui et al.

(10) Patent No.: US 10,339,393 B2
(45) Date of Patent: Jul. 2, 2019

(54) DEMARCATION LINE RECOGNITION APPARATUS

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Youhei Masui, Kariya (JP); Toyoharu Katsukura, Kariya (JP); Yoshihisa Ogata, Kariya (JP); Takeshi Nanami, Toyota (JP); Takashi Nishida, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/544,840

(22) PCT Filed: Jan. 18, 2016

(86) PCT No.: PCT/JP2016/051292
§ 371 (c)(1),
(2) Date: Jul. 19, 2017

(87) PCT Pub. No.: WO2016/117507
PCT Pub. Date: Jul. 28, 2016

(65) Prior Publication Data
US 2018/0012083 A1 Jan. 11, 2018

(30) Foreign Application Priority Data

Jan. 21, 2015 (JP) ................. 2015-009775

(51) Int. Cl.
G06K 9/00 (2006.01)
B60W 30/12 (2006.01)
G08G 1/16 (2006.01)

(52) U.S. Cl.
CPC ......... *G06K 9/00798* (2013.01); *B60W 30/12* (2013.01); *G08G 1/167* (2013.01)

(58) Field of Classification Search
None
See application file for complete search history.

(56) References Cited

U.S. PATENT DOCUMENTS

2011/0222732 A1* 9/2011 Higuchi ............... B60W 30/14
382/104
2011/0238252 A1* 9/2011 Takeda ............... B60W 40/072
701/31.4

(Continued)

FOREIGN PATENT DOCUMENTS

| JP | H07-311896 | 11/1995 |
| JP | 2001-10524 A | 1/2001 |
| JP | 2016-043837 | 4/2016 |

*Primary Examiner* — Delomia L Gilliard
(74) *Attorney, Agent, or Firm* — Knobbe, Martens, Olson & Bear, LLP

(57) ABSTRACT

A demarcation line recognition apparatus is applied to a vehicle in which an imaging apparatus that captures an image of an area ahead of the vehicle is mounted. The demarcation line recognition apparatus includes: a demarcation line recognizing unit that recognizes a traveling demarcation line that demarcates a traveling lane of the vehicle based on an image acquired by the imaging apparatus; and a demarcation line estimating unit that estimates a shape of the traveling demarcation line in a range that cannot be recognized by the demarcation line recognizing unit, based on the traveling demarcation line recognized by the demarcation line recognizing unit. The demarcation line recognition apparatus determines a reliability level of the (Continued)

traveling demarcation line recognized by the demarcation line recognizing unit and invalidates the estimation of the shape of the traveling demarcation line by the demarcation line estimating unit based on the determination result.

9 Claims, 3 Drawing Sheets

(56) References Cited

U.S. PATENT DOCUMENTS

| | | | | |
|---|---|---|---|---|
| 2014/0218509 A1* | 8/2014 | Kondo | ............... | G01C 21/3647 |
| | | | | 348/118 |
| 2015/0278613 A1* | 10/2015 | Takemae | ............ | G06K 9/00798 |
| | | | | 382/104 |
| 2018/0181819 A1* | 6/2018 | Kawano | ............. | G06K 9/00798 |

* cited by examiner (a)  (b)

DEMARCATION LINE RECOGNITION APPARATUS

CROSS-REFERENCE TO RELATED APPLICATIONS

The present application is based on and claims the benefit of priority from Japanese Patent Application No. 2015-009775, filed on Jan. 21, 2015, the description of which is incorporated herein by reference.

TECHNICAL FIELD

The present disclosure relates to a demarcation line recognition apparatus. Specifically, the present disclosure relates to a demarcation line recognition apparatus that is applied to a vehicle in which an imaging apparatus that captures an image of an area ahead of the vehicle is mounted.

BACKGROUND ART

As traveling assistance control of a vehicle, various types of control, such as an adaptive cruise control system and lane keeping assist, are known. In the adaptive cruise control system, a vehicle traveling in a same traffic lane as an own vehicle is selected as a leading vehicle, and the own vehicle travels such as to track the selected leading vehicle. In lane keeping assist, traveling of a vehicle is controlled such that the vehicle does not deviate from left and right traveling demarcation lines.

In such traveling assistance control, a camera is mounted to the vehicle. An image of an area ahead of the vehicle is captured and traveling demarcation lines are recognized. In addition, traveling of the vehicle is controlled through use of the recognized traveling demarcation lines (for example, refer to PTL 1). Regarding an apparatus described in PTL 1, it is disclosed that a clothoid parameter is calculated from traveling demarcation lines in an image captured by a camera. The clothoid parameter indicates a degree of curvature of a course. Future behavior of a vehicle on the course is predicted through use of the calculated clothoid parameter.

CITATION LIST

Patent Literature

[PTL 1] JP-A-2001-10524

SUMMARY OF INVENTION

Technical Problem

As a result of a shape of a traveling demarcation line farther than a recognition section of the traveling demarcation line being estimated based on a shape of the traveling demarcation line recognized from an image captured by an imaging apparatus, it is possible to perform vehicle traveling control in which information related to the traveling demarcation line at a long distance that cannot be recognized from the image is used. Meanwhile, when recognition accuracy of the traveling demarcation line recognized from the image is low, deviation between a white line shape at a long distance determined through estimation and an actual white line shape becomes large. As a result of thorough examination by the inventors, an issue has been found in that, in such cases, controllability of the vehicle traveling control based on the shape of the traveling demarcation line may decrease.

The present disclosure has been achieved in light of the above-described issue. An object of the present disclosure is to provide a demarcation line recognition apparatus that is capable of enabling a result that has high estimation accuracy, regarding a traveling demarcation line outside of a recognition range of an image, to be used for vehicle traveling control.

A demarcation line recognition apparatus according to an aspect of the present disclosure is a demarcation line recognition apparatus that is applied to a vehicle in which an imaging apparatus that captures an image of an area ahead of the vehicle is mounted. The demarcation line recognition apparatus includes: demarcation line recognizing means that recognizes a traveling demarcation line that demarcates a traveling lane of the vehicle based on an image of the area ahead of the vehicle acquired by the imaging apparatus; demarcation line estimating means that estimates a shape of the traveling demarcation line in a range that cannot be recognized by the demarcation line recognizing means, based on the traveling demarcation line recognized by the demarcation line recognizing means; reliability level determining means that determines a reliability level of the traveling demarcation line recognized by the demarcation line recognizing means; and estimation invalidating means that invalidates the estimation of the shape of the traveling demarcation line by the demarcation line estimating means, based on a determination result of the reliability level of the traveling demarcation line by the reliability level determining means.

In the above-described configuration, the configuration is such that the estimation of the shape of the traveling demarcation line in a range that cannot be recognized from an image is invalidated based on the reliability level of the traveling demarcation line recognized based on the image. When the shape of the traveling demarcation line in a range that cannot be recognized from an image is estimated using the traveling demarcation line recognized from the image, it can be considered that estimation accuracy decreases when the reliability level of the recognized traveling demarcation line is low, and controllability of traveling assistance control is affected. As a result of the above-described configuration being used in light of this issue, execution of vehicle travel control using a result of the traveling demarcation line that has a low estimation accuracy can be suppressed. Controllability of traveling assistance control of the vehicle can thereby be made favorable.

DESCRIPTION OF EMBODIMENTS

First Embodiment

A demarcation line recognition apparatus according to a present embodiment will hereinafter be described with reference to the drawings. The demarcation line recognition apparatus according to the present embodiment is mounted to a vehicle. The demarcation line recognition apparatus recognizes a white line serving as a traveling demarcation line that demarcates a traveling lane of the vehicle. Information (such as white line information) related to the white line recognized by the demarcation line recognition apparatus is used for traveling assistance control, such as adaptive cruise control and lane keeping assist. In adaptive cruise control, an own vehicle travels such as to track, among vehicles ahead that are traveling ahead of the own vehicle, a leading vehicle that is a vehicle traveling in a same traffic lane as the own vehicle. In lane keeping assist, traveling of a vehicle is controlled such that the vehicle does not deviate across a traveling demarcation line. First, an overall configuration of the demarcation line recognition apparatus according to the present embodiment will be described with reference to FIG. 1.

Figure 1:
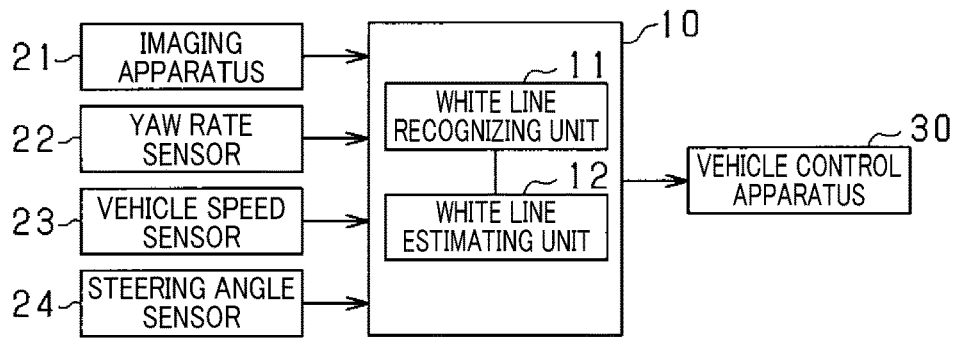
FIG. 1 is a block diagram of an overall configuration of a system having a demarcation line recognition apparatus according to a first embodiment.

A system shown in FIG. 1 is mounted to a vehicle and has a demarcation line recognition apparatus 10 according to the present embodiment. In FIG. 1, the demarcation line recognition apparatus 10 is a computer that includes a central processing unit (CPU), a read-only memory (ROM), a random access memory (RAM), an input/output (I/O), and the like. Each function (such as a demarcation line recognizing means, a demarcation line estimating means, a reliability level determining means, and an estimation invalidating means) of the demarcation line recognition apparatus 10 is actualized by the CPU running programs installed in the ROM. An imaging apparatus 21 is mounted to the vehicle (that is, an own vehicle). The imaging apparatus 21 serves as an object detecting means that detects an object present in a vehicle periphery. The demarcation line recognition apparatus 10 inputs an image captured by the imaging apparatus 21 and generates the white line information using the inputted image.

The imaging apparatus 21 is an onboard camera. The imaging apparatus 21 is configured by a charge-coupled device (CCD) camera, a complementary metal-oxide-semiconductor (CMOS) image sensor, a near-infrared camera, or the like. The imaging apparatus 21 captures an image of a peripheral environment including a traveling road of the own vehicle, generates image data expressing the captured image, and successively outputs the image data to the demarcation line recognition apparatus 10. The imaging apparatus 21 is set, for example, near an upper end of a front windshield of the own vehicle. The imaging apparatus 21 captures an image of an area that spreads over a range of a predetermined imaging angle δ towards an area ahead of the vehicle, with an imaging axis as the center. The imaging apparatus 21 may be a single lens camera or a stereo camera.

The demarcation line recognition apparatus 10 inputs the image data from the imaging apparatus 21 and also inputs respective detection signals from various sensors provided in the vehicle. In the system shown in FIG. 1, as the various sensors, a yaw rate sensor 22, a vehicle speed sensor 23, a steering angle sensor 24, and the like are provided. The yaw rate sensor 22 detects an angular velocity (such as a yaw rate) in a turning direction of the vehicle. The vehicle speed sensor 23 detects a vehicle speed. The steering angle sensor 24 detects a steering angle. The vehicle speed sensor 23 corresponds to vehicle speed detecting means. The yaw rate sensor 22 and the steering angle sensor 24 correspond to turning detecting means.

The demarcation line recognition apparatus 10 includes a white line recognizing unit 11 and a white line estimating unit 12. The white line recognizing unit 11 recognizes a white line that is positioned within the image captured by the imaging apparatus 21. The white line estimating unit 12 estimates a shape of a white line in an area that cannot be recognized by the white line recognizing unit 11, that is, a shape of a white line farther than a white line recognition range of the white line recognizing unit 11, using information related to the white line recognized by the white line recognizing unit 11.

Figure 2:
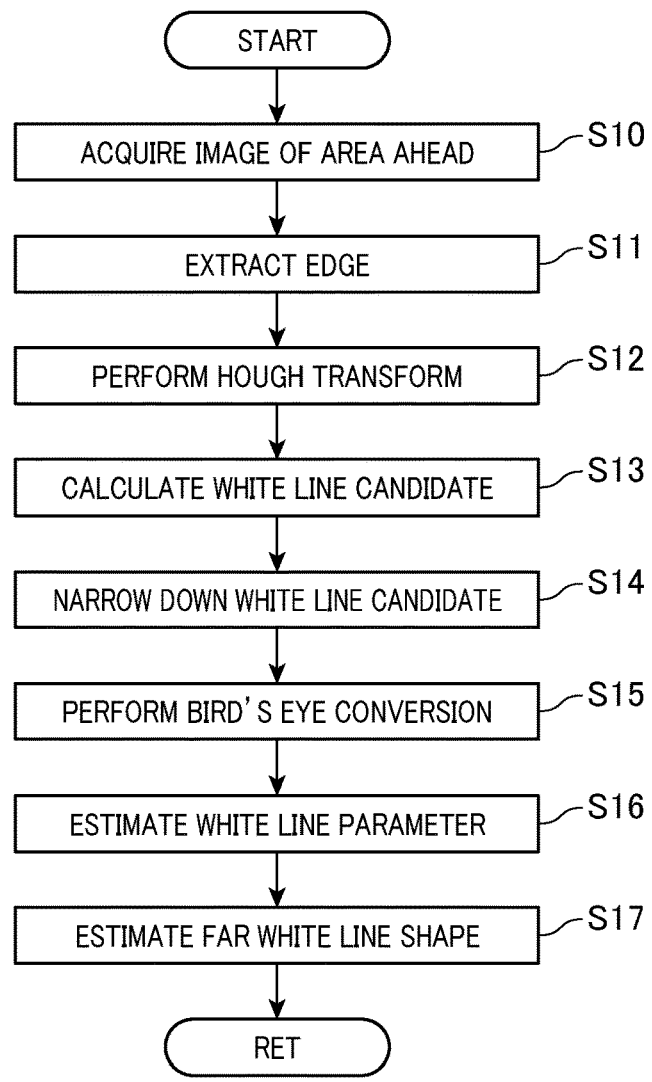
FIG. 2 is a flowchart of processing steps in a white line recognition process by the demarcation line recognition apparatus.

FIG. 2 is a flowchart of processing steps in a white line recognition process performed by the demarcation line recognition apparatus 10. The process is repeatedly performed by the CPU of the demarcation line recognition apparatus 10 at a predetermined control cycle. As a result of this process, each function of the white line recognizing unit 11 corresponding to the demarcation line recognizing means (such as a demarcation line recognizing unit), and the white line estimating unit 12 corresponding to the demarcation line estimating means (such as a demarcation line estimating unit), the reliability level determining means (such as a reliability level determining unit), and the estimation invalidating means (such as an estimation invalidating unit) are implemented.

In FIG. 2, at step S10, an image captured by the imaging apparatus 21 is acquired. At subsequent step S11, an edge point P is extracted based on luminance information of a road image in the acquired image. At step S12, a Hough transform is performed on the extracted edge point P. Here, extraction of a straight line or a curved line in which a plurality of edge points P are continuously aligned is extracted. At subsequent step S13, with the extracted straight line or curved line as a white line candidate, feature quantities of the white line candidates are calculated. At step S14, a pair of straight lines or curved lines that extend in an advancing direction of the vehicle is narrowed down from the white line candidates using the feature quantities.

Next, at step S15, a bird's eye conversion of the edge points P is performed. Specifically, a coordinate transform is performed on the edge points P of the white line candidate to which the white line candidates have been narrowed down, using an attachment position and an attachment angle of the imaging apparatus 21, and conversion to a planar view is performed. A range over which a white line is positioned in the acquired planar view is a white line recognition range. That is, in the image captured by the imaging apparatus 21, a white line shape from the own vehicle to a short distance D1 can be recognized. A position of the recognized white line that is the farthest from the own vehicle is an end portion of the white line recognition range. The planar image is an orthogonal coordinate system centered on the own vehicle, with a vehicle width direction of the own vehicle as an X axis and an advancing direction of the vehicle as a Y axis.

At subsequent step S16, a white line parameter η (such as a position of the white line, a slant of the white line, a width between white lines, a curvature of the white line, or a curvature change rate) is estimated. The white line parameter is a parameter that specifies the white line shape converted to the planar image. The estimation of the white line parameter η is performed by the white line shape converted to the planar image being approximated by a polynomial (such as a white line model).

Next, at step S17, the shape of the white line outside of the white line recognition range, that is, the white line farther than the nearby distance D1 (also referred to, hereafter, as a "far white line") is estimated by extrapolation based on the white line parameter η. The estimation of the shape of the far-off white line is performed based on a white line model using the white line parameter η. For example, at least one of the curvature of the white line and the curvature change rate (such as a clothoid parameter). The white line model may be approximation by a polynomial, or may be a table or the like. The white line parameter of the estimated white line is stored and the present routine is ended. According to the present embodiment, as a result of the processes from steps S10 to S15 by the demarcation line recognition apparatus 10, the function of the white line recognizing unit 11 corresponding to the demarcation line recognizing means is actualized. In addition, as a result of the processes at steps S16 and S17 by the demarcation line recognition apparatus 10, the function of the white line estimating unit 12 corresponding to the demarcation line estimating means is actualized.

Returning to the description of FIG. 1, information related to the white line recognized by the white line recognizing unit 11 and information related to the far white line estimated by the white line estimating unit 12 are inputted to a vehicle control apparatus 30. The vehicle control apparatus 30 actualizes traveling assistance control, such as an adaptive cruise control function and a lane keeping assist function.

Specifically, in the adaptive cruise control function, the vehicle speed of the own vehicle is controlled to a preset vehicle speed. In addition, an inter-vehicle distance between the own vehicle and a leading vehicle is controlled to a distance based on the vehicle speed of the own vehicle. Specifically, a movement trajectory of a vehicle ahead that is present ahead of the own vehicle is compared to the white line shape recognized by the white line recognizing unit 11 and the shape of the far white line estimated by the white line estimating unit 12. Then, when the movement trajectory of the vehicle ahead matches the white line shape and the shape of the far white line, the movement trajectory of the vehicle ahead is set as a future predicted course of the own vehicle. In addition, the leading vehicle to be tracked by the own vehicle is selected based on the predicted course, and engine control and brake control for tracking the selected leading vehicle are performed.

A method for predicting the future course of the own vehicle in adaptive cruise control is not limited to that described above. For example, a method in which the white line shape recognized by the white line recognizing unit 11 and the shape of the far white line estimated by the white line estimating unit 12 are set as the future predicted course of the own vehicle can be used. The information related to the white line recognized by the white line recognizing unit 11 and the information related to the far white line estimated by the white line estimating unit 12 correspond to information (such as white line information) related to a white line recognized by the demarcation line recognition apparatus.

In addition, in the lane keeping assist function, for example, a future position of the own vehicle is predicted based on the vehicle speed and the yaw rate. Whether or not the own vehicle may deviate from a white line is determined using the predicted future position, the white line shape, and the far white line shape. When a determination is made that the own vehicle may deviate from the white line, a warning display may be performed on an onboard display or notification may be given by a warning sound. In addition, in a system in which the vehicle control apparatus 30 provides a driving assistance function, steering force is applied to a steering wheel when the determination is made that the own vehicle may deviate from the white line.

Here, when a white line shape that is farther than the short distance D1 is estimated using the white line shape up to the short distance D1 recognized by the imaging apparatus 21, should the accuracy of the white line shape recognized by the imaging apparatus 21 be low, the estimation accuracy of the white line shape farther than the short distance D1 decreases. In particular, when the shape of the far white line is estimated based on the white line model, calculation error of the white line shape recognized from the image is amplified by the error in the white line model, and the estimation accuracy is more likely to decrease. In such cases, it can be considered that the discrepancy between the estimated white line shape and the actual white line shape increases, and the controllability of traveling assistance control decreases.

In light of this issue, according to the present embodiment, a white line reliability level is determined. The white line reliability level is a reliability level (certainty) of the white line recognized by the white line recognizing unit 11. Based on the determination result, the estimation of the white line shape by the white line estimating unit 12 is invalidated. According to the present embodiment, the white line reliability level is determined to be low when a predetermined reliability level determination condition prescribed in advance is met, and the estimation of the white line shape by the white line estimating unit 12 is invalidated. The reliability level determination condition includes three conditions, that is, a first condition to a third condition, described below. According to the present embodiment, the estimation of the white line shape by the white line estimating unit 12 is invalidated when at least one of the three conditions is met.

First condition: The vehicle speed of the own vehicle is equal to or lower than a predetermined low vehicle speed determination value Vth.

Second condition: The yaw rate of the own vehicle is greater than a predetermined value θth.

Third condition: A variation in a width between white lines is present ahead of the own vehicle.

First, regarding the first condition, in a vehicle providing the adaptive cruise control function, the inter-vehicle distance is controlled such that the inter-vehicle distance between the own vehicle and the leading vehicle is a distance based on the vehicle speed of the own vehicle. Specifically, the inter-vehicle distance is controlled such that the inter-vehicle distance between the own vehicle and the leading vehicle increases as the vehicle speed of the own vehicle increases. Therefore, in a situation in which the own vehicle is traveling in a low vehicle speed area, such as when the own vehicle is traveling in an urban area or a congested section of an expressway, the inter-vehicle distance to the leading vehicle may be short. In addition, visibility of the white line from the own vehicle differs based on the inter-vehicle distance to the leading vehicle. The distance of the white line that is recognizable from the image decreases as the inter-vehicle distance to the leading vehicle decreases.

Figure 3:
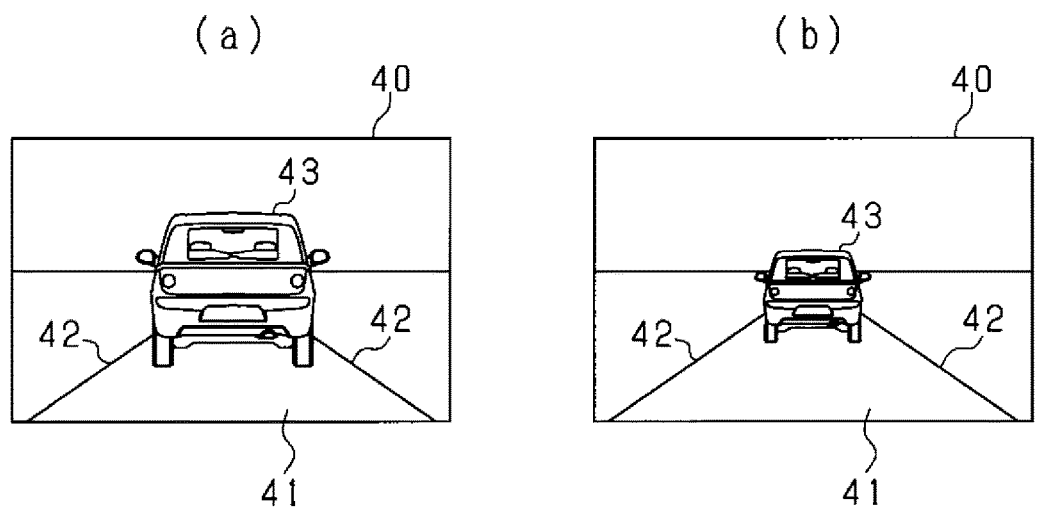
FIG. 3 illustrates, by (a) and (b), diagrams of two images in which an inter-vehicle distance to a leading vehicle differs.

FIG. 3 is a diagram of two images 40 in which the inter-vehicle distance to a leading vehicle 43 differs. FIG. 3 shows, by (a), when the inter-vehicle distance is short and, by (b), when the inter-vehicle distance is long. As shown in FIG. 3, when the leading vehicle 43 that is traveling in an own traffic lane 41 ahead of the own vehicle is present, a white line recognition distance becomes short as a result of the white line being hidden by the leading vehicle 43. In addition, the white line recognition distance at this time is shorter when the inter-vehicle distance to the leading vehicle 43 is short, compared to when the inter-vehicle distance is long. Therefore, according to the present embodiment, the own vehicle being in a traveling state in which the vehicle speed of the own vehicle is equal to or lower than the low vehicle speed determination value Vth is included in the reliability level determination condition. When this first condition is met, the white line reliability level of the white line recognized by the white line recognizing unit 11 is considered low, and the estimation of the white line shape by the white line estimating unit 12 is invalidated.

In the configuration in which whether or not the situation is such that the inter-vehicle distance to the leading vehicle 43 is short is determined based on the vehicle speed, in a situation in which the inter-vehicle distance to the leading vehicle 43 is likely to become short, the estimation of the white line shape by the white line estimating unit 12 is invalidated. Therefore, when a vehicle traveling in an adjacent traffic lane changes lanes from the adjacent traffic lane to the own traffic lane 41, the estimation of the white line shape can be invalidated in advance in a situation in which the white line reliability level decreases.

Next, regarding the second condition, the own vehicle may be changing lanes when the yaw rate of the own vehicle is large. In addition, when the own vehicle is changing lanes, the slant of the white line viewed from the own vehicle becomes gentler, that is, a curve radius R of the white line decreases, and the edge points P of the white line become difficult to detect. In such cases, the recognition accuracy of the white line by the white line recognizing unit 11 decreases. Therefore, according to the present embodiment, the yaw rate of the own vehicle being greater than the predetermined value θth is included in the reliability level determination condition. When this second condition is met, the white line reliability level of the white line recognized by the white line recognizing unit 11 is considered low, and the estimation of the white line shape by the white line estimating unit 12 is invalidated. The second condition is a determination condition for determining whether or not the own vehicle is a predetermined turning state in which the own vehicle is making a turn at an angular velocity greater than a predetermined angular velocity in relation to the white line 42.

Regarding the third condition, when a variation in the width between white lines is present ahead of the own vehicle, it is presumed that the own vehicle is traveling in a section in which the road width has decreased, in a lane merging section, or the like. In this case, there is a likelihood that the road shape is deformed, or the road shape and the white line shape do not match. In such cases, when the white line shape farther than the short distance D1 is estimated using the white line shape up to the short distance D1 recognized by the white line recognizing unit 11, the deviation between the estimated white line shape and the actual white line shape may be large. Therefore, according to the present embodiment, the variation in the width between white lines being present ahead of the own vehicle is included in the reliability level determination condition. When this third condition is met, the white line reliability level of the white line recognized by the white line recognizing unit 11 is considered low, and the estimation of the white line shape by the white line estimating unit 12 is invalidated.

Figure 4:
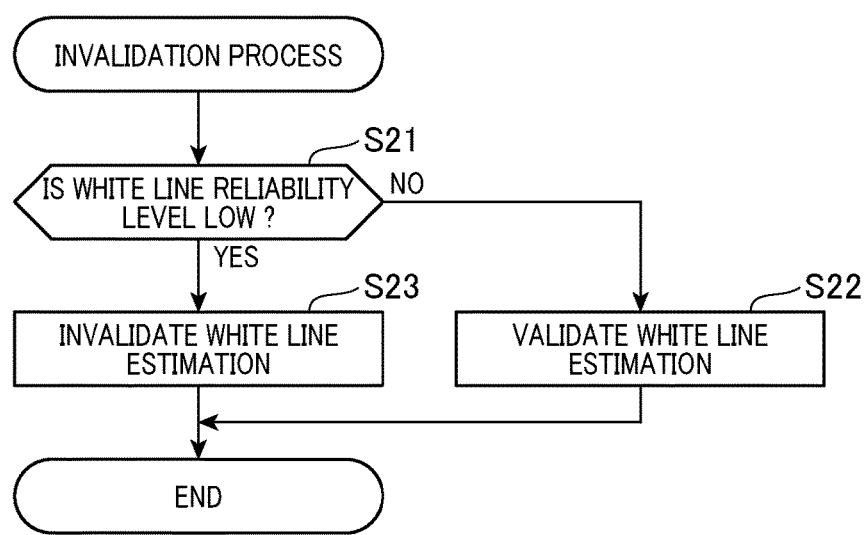
FIG. 4 is a flowchart of processing steps in an invalidation process by a white line estimating unit.
Figure 5:
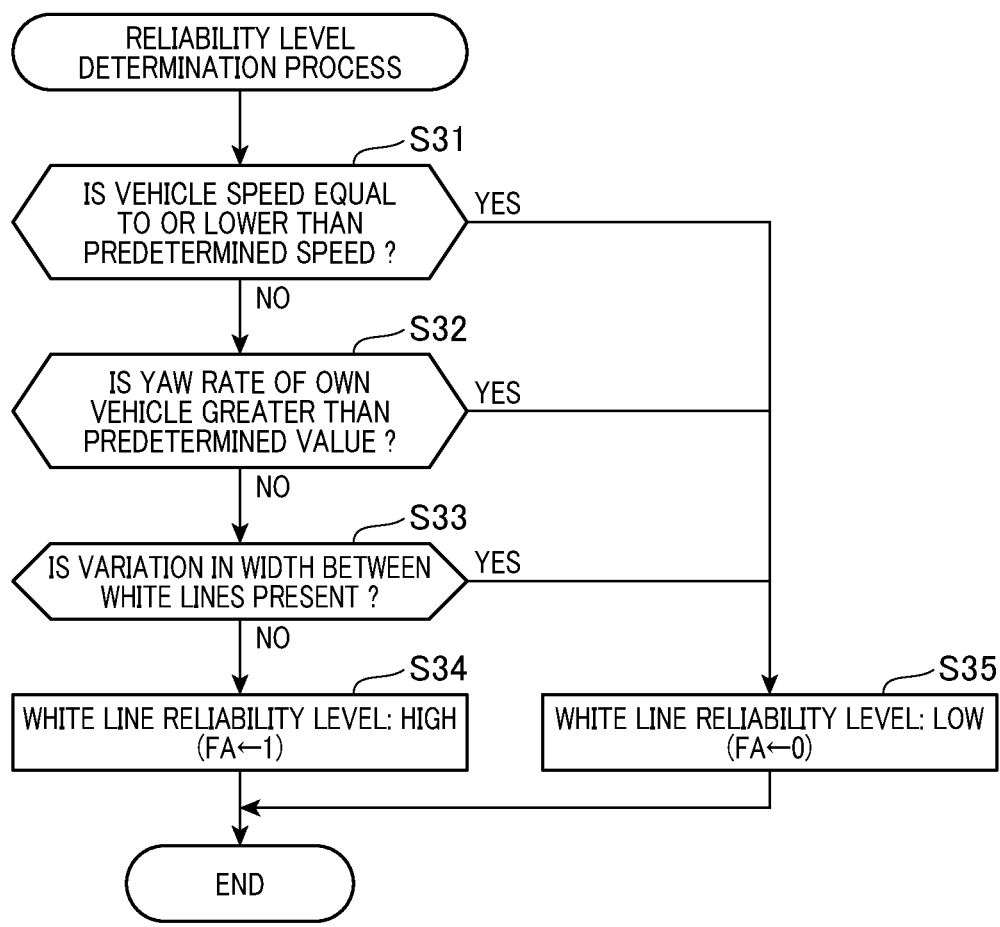
FIG. 5 is a flowchart of processing steps in a reliability level determination process performed by the white line estimating unit.

Next, a specific aspect according to the present embodiment will be described with reference to the flowcharts in FIGS. 4 and 5. The processes are performed by the white line estimating unit 12 at a predetermined cycle.

First, an invalidation process in FIG. 4 will be described. In FIG. 4, at step S21, whether or not the white line reliability level is low is determined. Here, a reliability level determination flag FA set by a reliability level determination process in FIG. 5 is acquired. The determination is made based on the acquired flag FA. According to the present embodiment, the reliability level determination flag FA is set to 0 when the white line reliability level is at a low level and set to 1 when the white line reliability level is at a high level.

When a determination is made that the white line reliability level is high, the process proceeds to step S22. The estimation of the white line shape by the white line estimating unit 12 is validated. In this case, vehicle traveling control is performed using the information related to the white line recognized by the white line recognizing unit 11 and the information related to the far white line estimated by the white line estimating unit 12.

Meanwhile, when a determination is made that the white line reliability level is low, the process proceeds to step S23. The estimation of the white line shape by the white line estimating unit 12 is invalidated. Here, "the estimation of the white line shape by the white line estimating unit 12 is invalidated" includes execution of a calculation process for estimating the shape of the far white line by the white line estimating unit 12 being prohibited, the result estimated by the white line estimating unit 12 being deleted, the result estimated by the white line estimating unit 12 not being used for traveling assistance control, and the like. According to the present embodiment, one of these three processes is performed. Even when the estimation of the white line shape by the white line estimating unit 12 is invalidated, use of the information related to the white line recognized by the white line recognizing unit 11 is permitted. According to the present embodiment, the invalidation process from steps S21 to S23 by the white line estimating unit 12 corresponds to the estimation invalidating means.

Next, the reliability level determination process in FIG. 5 will be described. In FIG. 5, at step S31, whether or not the vehicle speed of the own vehicle is equal to or lower than the prescribed low vehicle speed determination value Vth is determined. Here, the determination is made using the vehicle speed detected by the vehicle speed sensor 23. At step S32, whether or not the yaw rate of the own vehicle detected by the yaw rate sensor 22 is greater than the predetermined value θth is determined.

At step S33, whether or not a variation in the width between white lines is present ahead of the own vehicle is determined. Specifically, the determination is made using the recognition result of the white line by the white line recognizing unit 11. When the distance between a pair of white lines in the width direction of the vehicle changes ahead of the own vehicle and a change amount of the change is equal to or greater than a predetermined value, a determination is made that the variation in the width between white lines is present ahead of the own vehicle.

When a negative determination is made for all of the processes at steps S31, S32, and S33, that is, when a determination is made that all of the first to third conditions are met, the process proceeds to step S34. The reliability level determination flag FA is set to 1. Meanwhile, when an affirmative determination is made at any of the steps S31, S32, and S33, the process proceeds to step S35. The reliability level determination flag FA is set to 0. According to the present embodiment, the reliability level determination process from steps S31 to S35 by the white line estimating unit 12 corresponds to the reliability level determining means.

According to the present embodiment described in detail above, the following excellent effects are achieved.

The configuration is such that the estimation of a white line shape farther than the white line recognition range is invalidated based on the reliability level of the white line 42 recognized based on the image 40. When the white line shape in a range that could not be recognized in the image 40 is estimated using the white line 42 recognized from the image 40, the estimation accuracy of the white line shape decreases when the reliability level of the recognized white line 42 is low. As a result of the above-described configuration being used in light of this issue, execution of vehicle traveling control using information related to a white line that has a low estimation accuracy can be suppressed. Controllability of traveling assistance control of the vehicle can thereby be made favorable.

The configuration is such that the vehicle speed of the own vehicle being equal to or lower than the predetermined low vehicle speed determination value Vth (first condition) is included as the reliability level determination condition. When the vehicle speed is equal to or lower than the low vehicle speed determination value Vth, the estimation of the white line shape by the white line estimating unit 12 is invalidated. As a result of a configuration such as this, when the estimation accuracy of the white line by the white line estimating unit 12 is low due to the white line recognition distance by the image being short, execution of vehicle traveling control using the estimation result of this white line can be prevented.

The configuration is such that the yaw rate of the own vehicle being greater than the predetermined value θth (that is, the second condition) is included as the reliability level determination condition. When the yaw rate of the own vehicle is greater than the predetermined value θth, the estimation of the white line shape by the white line estimating unit 12 is invalidated. As a result of this configuration, when the estimation accuracy of the white line by the white line estimating unit 12 is low due to the detection accuracy of the edge points P of the white line decreasing, execution of vehicle traveling control using the estimation result of this white line can be prevented.

The configuration is such that a variation in the width between white lines being present ahead of the own vehicle (that is, the third condition) is included as the reliability level determination condition. When a variation in the width between white lines is present ahead of the own vehicle, the estimation of the white line shape by the white line estimating unit 12 is invalidated. As a result of a configuration such as this, when the estimation accuracy of the white line by the white line estimating unit 12 is low due to the road shape not being a fixed shape, or the road shape and the white line shape not matching, execution of vehicle traveling control using the estimation result of this white line can be prevented.

(Other Embodiments)

The present disclosure is not limited to the above-described embodiment and can be carried out with various modifications. For example, the present disclosure may be carried out in the following manner.

According to the above-described embodiment, the configuration is such that the first condition to third condition are included as the reliability level determination condition. However, the configuration may be such that one or two of the first condition to third condition are included in the reliability level determination condition. The estimation of the white line shape by the white line estimating unit 12 is invalidated when at least one condition is met.

According to the above-described embodiment, the yaw rate sensor 22 is used as the turning detecting means that detects the turning state of the own vehicle. The estimation of the white line shape by the white line estimating unit 12 is invalidated when the yaw rate of the own vehicle is greater than the predetermined value θth. However, the turning detecting means is not limited to that described above. For example, the steering angle sensor 24 may be used as the turning detecting means. When the steering angle of the own vehicle is greater than a predetermined value, the own vehicle may be considered to be in a predetermined turning state, and the estimation of the white line shape by the white line estimating unit 12 may be invalidated. Alternatively, the imaging apparatus 21 may be used as the turning detecting means. A determination may be made that the own vehicle is in a predetermined turning state based on image data.

According to the above-described embodiment, the vehicle speed of the own vehicle being equal to or lower than the predetermined low vehicle speed determination value Vth (that is, the first condition) may be determined based on the detection result of the inter-vehicle distance to the leading vehicle 43 by the object detecting means. In this case, the configuration is such that a determination is made that the first condition is met when the detected inter-vehicle distance is shorter than a determination value, and the estimation of the white line shape by the white line estimating unit 12 is invalidated.

Conditions other than the first condition to third condition, described above, may be included as the reliability level determination condition. For example, it can be considered that the recognition accuracy of the white line decreases at night, or in a rainy or snowy environment. Therefore, a reliability level determination condition based on the environment, specifically, the environment being night, rainy, snowy, and the like may be included.

According to the above-described embodiment, the configuration includes the imaging apparatus as the object detecting means. However, the present disclosure may also be applied to a system that includes a radar apparatus or a sonar in addition to the imaging apparatus.

According to the above-described embodiment, in the demarcation line recognition apparatus 10, a program is stored in the ROM, which corresponds to a non-transient, tangible recording medium. Each function of the demarcation line recognition apparatus 10 is actualized by the CPU, which corresponds to a processor of a computer, running the program. However, the configuration may be such that a program is stored in a non-transient, tangible recording medium (such as a non-volatile memory other than the ROM) other than the ROM, and a processor such as the CPU runs the program. In this case, the configuration may be such that, in the demarcation line recognition apparatus 10, as a result of the processor running the program stored in the non-transient, tangible recording medium, a method corresponding to the program (such as a demarcation line recognition method) is performed.

In addition, some or all of the functions performed by the demarcation line recognition apparatus 10 may be configured by hardware, such as by a single or a plurality of integrated circuits (that is, ICs). Furthermore, each means (such as the demarcation line recognizing means corresponding to the white line recognizing unit 11, the demarcation line estimating means corresponding to the white line estimating unit 12, the reliability level determining means, and the estimation invalidating means) provided by the demarcation line recognition apparatus 10 may be provided by software recorded in a non-transient, tangible recording medium such as a non-volatile memory and a computer that runs the software, by only hardware, or by a combination thereof.

The invention claimed is:

1. A demarcation line recognition apparatus that is applied to a vehicle in which an imaging apparatus that captures an image of an area ahead of the vehicle is mounted, the demarcation line recognition apparatus comprising:
a demarcation line recognizing unit that recognizes, using a processor, a traveling demarcation line that demarcates a traveling lane of the vehicle based on an image of the area ahead of the vehicle acquired by the imaging apparatus;
a demarcation line estimating unit that estimates, using the processor, a shape of the traveling demarcation line in a range that cannot be recognized by the demarcation line recognizing unit, based on the traveling demarcation line recognized by the demarcation line recognizing unit;
a reliability level determining unit that determines, using the processor, a reliability level of the traveling demarcation line recognized by the demarcation line recognizing unit; and
an estimation invalidating unit that invalidates, using the processor, the estimation of the shape of the traveling demarcation line by the demarcation line estimating unit, based on a determination result of the reliability level of the traveling demarcation line by the reliability level determining unit.

2. The demarcation line recognition apparatus according to claim 1, further comprising:
a vehicle speed sensor that detects a speed of the vehicle, wherein
the reliability level determining unit determines whether or not the speed detected by the vehicle speed sensor is equal to or lower than a predetermined low vehicle speed determination value, as the reliability level of the traveling demarcation line, and
the estimation invalidating unit invalidates the estimation of the traveling demarcation line by the demarcation line estimating unit in response to the reliability level determining unit determining that the speed of the vehicle is equal to or lower than the predetermined low vehicle speed determination value.

3. The demarcation line recognition apparatus according to claim 2, further comprising:
a turning sensor that detects a turning state of the vehicle, wherein
the reliability level determining unit determines whether or not the vehicle is in a predetermined turning state in which the vehicle is turning at an angular velocity greater than a predetermined angular velocity in relation to the traveling demarcation line by the turning sensor, as the reliability level of the traveling demarcation line, and
the estimation invalidating unit invalidates the estimation of the traveling demarcation line by the demarcation line estimating unit in response to the reliability level determining unit determining that the vehicle is in the predetermined turning state.

4. The demarcation line recognition apparatus according to claim 3, wherein:
the reliability level determining unit determines whether or not a variation in a width between traveling demarcation lines is present ahead of the vehicle, as the reliability level of the traveling demarcation line; and
the estimation invalidating unit invalidates the estimation of the traveling demarcation line by the demarcation line estimating unit in response to the reliability level determining unit determining that a variation in the width between traveling demarcation lines is present.

5. A demarcation line recognition method comprising:
recognizing, by a demarcation line recognition apparatus mounted to a vehicle, a traveling demarcation line that demarcates a traveling lane of the vehicle based on an image of an area ahead of the vehicle acquired by an imaging apparatus mounted to the vehicle;
estimating, by the demarcation line recognition apparatus, a shape of the traveling demarcation line in a range that cannot be recognized from the image, based on the traveling demarcation line recognized from the image;
determining, by the demarcation line recognition apparatus, a reliability level of the traveling demarcation line recognized from the image; and
invalidating, by the demarcation line recognition apparatus, the estimation of the shape of the traveling demarcation line, based on a determination result of the reliability level of the traveling demarcation line.

6. The demarcation line recognition apparatus according to claim 1, further comprising:
a turning sensor that detects a turning state of the vehicle, wherein
the reliability level determining unit determines whether or not the vehicle is in a predetermined turning state in which the vehicle is turning at an angular velocity greater than a predetermined angular velocity in relation to the traveling demarcation line by the turning sensor, as the reliability level of the traveling demarcation line, and
the estimation invalidating unit invalidates the estimation of the traveling demarcation line by the demarcation line estimating unit in response to the reliability level determining unit determining that the vehicle is in the predetermined turning state.

7. The demarcation line recognition apparatus according to claim 1, wherein:
the reliability level determining unit determines whether or not a variation in a width between traveling demarcation lines is present ahead of the vehicle, as the reliability level of the traveling demarcation line; and
the estimation invalidating unit invalidates the estimation of the traveling demarcation line by the demarcation line estimating unit in response to the reliability level determining unit determining that a variation in the width of the traveling demarcation line is present.

8. The demarcation line recognition apparatus according to claim 2, wherein:
the reliability level determining unit determines whether or not a variation in a width between traveling demarcation lines is present ahead of the vehicle, as the reliability level of the traveling demarcation line; and
the estimation invalidating unit invalidates the estimation of the traveling demarcation line by the demarcation line estimating unit in response to the reliability level determining unit determining that a variation in the width of the traveling demarcation line is present.

9. A system for a vehicle to recognize a demarcation line comprising:
a central processor;
a non-transitory computer-readable storage medium; and a set of computer-executable instructions stored on the computer-readable storage medium that cause the central processor to implement:
  recognizing a traveling demarcation line that demarcates a traveling lane of the vehicle based on an image of an area ahead of the vehicle acquired by an imaging apparatus mounted to the vehicle;
  estimating a shape of the traveling demarcation line in a range that cannot be recognized from the image, based on the traveling demarcation line recognized from the image;
  determining a reliability level of the traveling demarcation line recognized from the image; and
  invalidating the estimation of the shape of the traveling demarcation line, based on a determination result of the reliability level of the traveling demarcation line.

* * * * *